US010403164B2

(12) United States Patent
Tischer et al.

(10) Patent No.: US 10,403,164 B2
(45) Date of Patent: Sep. 3, 2019

(54) SELF-PROPELLED, HIGHLY DYNAMIC DRIVING SIMULATOR

(71) Applicant: AMST-SYSTEMTECHNIK GMBH, Ranshofen (AT)

(72) Inventors: Wolfgang Tischer, Ranshofen (AT); Guenther Prokop, Dresden (DE)

(73) Assignee: AMST-Systemtechnik GmbH, Ranshofen (AT)

( * ) Notice: Subject to any disclaimer, the term of this patent is extended or adjusted under 35 U.S.C. 154(b) by 514 days.

(21) Appl. No.: 14/898,313

(22) PCT Filed: Jun. 13, 2014

(86) PCT No.: PCT/EP2014/062304
§ 371 (c)(1),
(2) Date: Dec. 14, 2015

(87) PCT Pub. No.: WO2014/198861
PCT Pub. Date: Dec. 18, 2014

(65) Prior Publication Data
US 2016/0140861 A1 May 19, 2016

(30) Foreign Application Priority Data

Jun. 13, 2013 (AT) .................................... 202/2013
Nov. 11, 2013 (AT) .................................... 866/2013

(51) Int. Cl.
*G09B 9/04* (2006.01)
*A63G 31/16* (2006.01)
(Continued)

(52) U.S. Cl.
CPC ............... *G09B 9/04* (2013.01); *A63G 31/16* (2013.01); *B60G 3/20* (2013.01); *B60G 17/00* (2013.01);
(Continued)

(58) Field of Classification Search
None
See application file for complete search history.

(56) References Cited

U.S. PATENT DOCUMENTS 4,159,128 A 6/1979 Blaine
4,266,627 A 5/1981 Lauber
(Continued)

FOREIGN PATENT DOCUMENTS

DE 2842409 A1 4/1980
DE 10119486 A1 10/2002
(Continued)

OTHER PUBLICATIONS

L D Chen et al: "NADS At the University of Iowa: A Tool for Driving Safety Research", Proceedings of the 1st Human-Centered Transportation 'simulation Conference, Jan. 1, 2001 (Jan. 1, 2001), XP055137483. ISSN: 1538-3288, Retrieved from the Internet: URL:https://www.nads-sc.uiowa.edu/dscna/2001/Papers/Chen_NADS%20at%20the%20University%20of%20Iowa....pdf, [retrieved on Sep. 1, 2014], p. 3-p. 5.
(Continued)

*Primary Examiner* — James B Hull
(74) *Attorney, Agent, or Firm* — Gordon & Jacobson, P.C.

(57) ABSTRACT

A self-propelled driving simulator has a machine frame which can be moved by three, preferably four or more, wheel assemblies on an underlying surface. The wheel assemblies each contain at least one wheel which can move on the underlying surface and which is arranged so as to be rotatable about a steering axle. The machine frame is coupled to a cockpit which contains a seat for a person as well as operator control elements for controlling the driving simulator. The cockpit has a degree of freedom of rotational movement with respect to the machine frame, with the result that the cockpit can be rotated with respect to the machine (Continued)

frame about a main rotational axis, and/or wherein the main rotational axis is preferably a normal vector of the plane spanned by the wheel contact faces of the wheels on the underlying surface.

20 Claims, 8 Drawing Sheets

(51) Int. Cl.
  *G09B 9/05* (2006.01)
  *B60G 3/20* (2006.01)
  *G09B 9/12* (2006.01)
  *B60G 17/00* (2006.01)
  *B60G 21/00* (2006.01)
  *G09B 9/06* (2006.01)

(52) U.S. Cl.
  CPC ............. *B60G 21/007* (2013.01); *G09B 9/05* (2013.01); *G09B 9/06* (2013.01); *G09B 9/12* (2013.01); *B60G 2200/144* (2013.01); *B60G 2202/122* (2013.01); *B60G 2300/37* (2013.01)

(56) References Cited

U.S. PATENT DOCUMENTS

| | | | |
|---|---|---|---|
| 6,095,926 A | 8/2000 | Hettema et al. | |
| 6,719,563 B2* | 4/2004 | Donges | G09B 9/05 434/29 |
| 2002/0197585 A1 | 12/2002 | Moran | |
| 2004/0070157 A1* | 4/2004 | Boice | B60G 9/00 280/6.15 |
| 2007/0269771 A1* | 11/2007 | Lefton | G09B 9/14 434/29 |

FOREIGN PATENT DOCUMENTS

| | | |
|---|---|---|
| EP | 1231582 A2 | 8/2002 |
| WO | 9956846 A1 | 11/1999 |

OTHER PUBLICATIONS

Slob et al: "State-of-the-Art Driving Simulators, a Literature Survey", Internet Citation, Aug. 1, 2008 (Aug. 1, 2008), page Complete, XP007910411, Retrieved from the Internet: URL:http://www.mate.tue.nl/matejpdfs/9611.pdf, [retrieved on Nov. 3, 2009] Chapter 2.

* cited by examiner

SELF-PROPELLED, HIGHLY DYNAMIC DRIVING SIMULATOR

BACKGROUND OF THE INVENTION

Field of the Invention

The invention relates to a driving simulator, in particular a self-propelled driving simulator, having a machine frame which can be moved by means of three, preferably four or more, wheel assemblies on an underlying surface, wherein the wheel assemblies each comprise at least one wheel which can move on the underlying surface and which is arranged so as to be rotatable about a steering axis, wherein the machine frame is coupled to a control cabin which comprises a seat for a person as well as operator control elements for controlling the driving simulator.

Typical fields of application of the simulator lie in the fields of vehicle development, road safety, mobility, integral safety, driver assistance systems, and basic automotive research.

Driving simulators are known in which a movable slide can be slid via movement components in a predetermined movement space. These movement components are formed for example as cross members, similarly to a crane trolley. The dynamics and the application areas of these prior art simulators are severely limited by the mass of the movement components. This makes the simulation of highly dynamic driving maneuvers impossible or severely limited.

In particular, the invention relates to a driving simulator as described in the Austrian utility model application GM202/2013.

The driving simulator can be formed as an automotive test vehicle which comprises a fully functional cockpit having a seat, instrument panel, control elements with force feedback, rear-view mirror and/or other operator control elements. The cockpit may be formed either generically or where appropriate in a type-specific manner. The reproduced cockpit of the vehicle may correspond ergonomically and functionally to the cockpit of an actual passenger vehicle as accurately as possible. This includes for example the view through the windscreen and side windows, the internal and external mirrors, and the corresponding features of the passenger car body (for example A- and B-pillars, center console, interior, internal door trim, etc.).

The cockpit and/or the control cabin are preferably fixedly and in particular rigidly connected to an element of a movement device of the simulator which allows an actively controlled or regulated movement of the cockpit by predetermined degrees of freedom with respect to the machine frame.

The driving simulator is preferably formed as a self-propelled vehicle that can be controlled from a cockpit and that can be controlled, in particular in-the-loop, by the person sitting in the cockpit.

Furthermore, an image display area for showing a real or computer-generated external view may be provided.

The wheels are preferably formed as tires. Depending on the load, commercially available passenger car tires or truck tires can be used.

The vehicle may move substantially freely on a surface.

Exemplary selected technical parameters for a preferred embodiment are: transverse accelerations in x and y: ±1 G; bandwidth of transverse (lateral) accelerations, lengthwise (longitudinal) accelerations, roll: <4 Hz (phase fidelity—the phase-fidelity representation relates in particular to the transverse acceleration, inclusive of roll and yaw, and also to the longitudinal acceleration inclusive of pitch.); movement area in a hall: approximately 70×70 m or larger; speed up to approximately 50 km/h; field of vision of external view: at least 220° horizontally.

BRIEF SUMMARY OF THE INVENTION

The present invention concerns a highly dynamic, self-propelled driving simulator. This is formed in particular in such a way that all components necessary for the simulation are provided on the driving simulator itself. This also concerns in particular those components necessary for moving the driving simulator. For this reason, the driving simulator can be used on any suitable driving surface or any suitable underlying surface (for example driving surfaces having a sufficiently flat underlying surface which has a sufficiently high friction value, for example asphalt surfaces, concrete surfaces, plastic coverings, etc.), whereby the area of use or the movement area is substantially unlimited. Examples of driving surfaces or an exemplary underlying surface include concrete surfaces or asphalt surfaces, streets, etc. Due to the configuration according to the invention, the simulator has an area of use of more than 500 meters, for example.

The driving simulator according to the invention or the method according to the invention serves where appropriate for the simulation of highly dynamic driving states. Examples of driving maneuvers of this type include slalom driving, swerving maneuvers, braking maneuvers, etc. and also maneuvers at high speeds of more than 50 km/h or more than 80 km/h.

The characteristics of a vehicle, in particular the behavior of an actual vehicle under acceleration changes of this type, are important for the safety and the quality perception of the driver. Modern passenger car chassis are highly complex kinematic and in particular elastokinematic devices. One purpose of modern chassis is on the one hand to optimize the driving behavior and/or the traction. A further purpose of a chassis is to provide the driver with tactile feedback regarding the prevailing force conditions. The intensity of pitch or roll movements for example should be reflected in a comprehensible representation of the prevailing driving state. A further fundamental purpose of a chassis is also to improve the driving comfort.

The braking behavior or the acceleration behavior, and in particular also the gradation of a transmission, also contribute directly to the driving experience.

The simulator according to the invention enables a flexible dynamic simulation of different chassis designs, braking characteristics, acceleration characteristics, transmission gradations, etc. In particular, these simulated driving properties and characteristics can be changed by simple control selection possibilities on the simulator.

Due to the embodiment of the simulator, it is possible to test computer-generated virtual driving properties of a vehicle on the driving simulator according to the invention before the realization in a prototype. Virtually present properties of the vehicle to be constructed can thus be tested in a real environment in a very early phase of the vehicle development without having to sustain the high costs of a prototype for this purpose. These real tests of the virtually developed driving models, however, are only possible with a highly dynamic driving simulator, since otherwise the simulated procedures would deviate too significantly from reality.

The object of the invention is to create a driving simulator which enables an improvement of the dynamic simulation in that
the sensations to be simulated are presented as flexibly and as close to reality as possible,
wherein at the same time the sensations of the operator are to be decoupled to the greatest possible extent from interfering influences of the real environment and/or the simulator.
This comprises in particular the synergistic cooperation between
the improvement of the decoupling of the control cabin from the underlying surface by optimization of the dynamic wheel kinematics,
and the optimization of the simulation of acceleration states by the movement of the control cabin with respect to the underlying surface and with respect to the machine frame.
Due to both measures, an improvement of the dynamic simulation can be attained.

The object according to the invention is achieved in particular by the features of the independent claims.

The decoupling of the cabin from interfering influences of the environment and the underlying surface is implemented in particular by a kinematics arrangement, a movement device and where appropriate by a guide device and/or a closed-off control cabin or external shell, by means of which the real optical or acoustic sensations of the external world are screened off.

The improvement of the dynamic wheel kinematics is also attained by these components, wherein in particular the rotatability of the control cabin with respect to the machine frame and the rotatability of the wheel assemblies and the kinematics arrangement have a significant influence on the fact that the self-propelled driving simulator is suitable for the simulation of highly dynamic movements.

The invention relates to a self-propelled driving simulator having a machine frame which can be moved by means of three, preferably four or more, wheel assemblies on an underlying surface, wherein the wheel assemblies each comprise at least one wheel which can move on the underlying surface and which is arranged so as to be rotatable about a steering axis, wherein the machine frame is coupled to a control cabin which comprises a seat for a person as well as operator control elements for controlling the driving simulator, wherein the control cabin has a degree of freedom of rotation with respect to the machine frame, with the result that the control cabin can be rotated with respect to the machine frame about a main axis of rotation, and wherein the main axis of rotation is preferably substantially a normal vector of the plane spanned by the wheel contact faces of the wheels on the underlying surface.

At least one wheel assembly where appropriate comprises a wheel drive for driving a wheel about the wheel axis, wherein preferably a plurality of wheel assemblies or all wheel assemblies each comprise at least one wheel drive for driving a wheel about the respective wheel axis.

The wheel or the wheels of each wheel assembly where appropriate is/are rotatable over 360° about the steering axis, in particular arbitrarily, in an unlimited manner and/or in both directions of rotation.

The control cabin where appropriate is rotatable with respect to the machine frame over 360° about the main axis of rotation, preferably arbitrarily, in an unlimited manner and/or in both directions of rotation.

The wheels of one, two, three or all wheel assemblies where appropriate is/are arranged rotatably about the respective steering axis so as to be actively steerable via a steering drive.

There are two wheels provided per wheel assembly where appropriate.

Where appropriate, the steering drive is formed by a rotary drive of the steering axis; or the steering drive is driven, formed or supported by a rotational speed difference between two wheels of a wheel assembly distanced from one another and driven about their respective wheel axis; or the steering drive is formed by a rotary drive of the steering axis and by a rotational speed difference between two wheels (4) of a wheel assembly distanced from one another and driven about their respective wheel axis.

Where appropriate the wheel assemblies and/or the wheels are connected to the machine frame via a kinematics arrangement, which in particular is formed as a chassis, wherein the kinematics arrangement comprises resilient and/or damping elements, such as a spring-damper arrangement and a wheel suspension in order to damp and/or cushion unevennesses in the underlying surface.

Where appropriate, a relative movement of the machine frame with respect to the underlying surface, the wheels and/or the wheel assemblies is made possible via the kinematics arrangement, wherein the relative movement is made possible in particular in or along the direction of the main axis of rotation.

Where appropriate, a movement device is provided, via which the control cabin is connected to the machine frame, wherein an active rotation of the control cabin with respect to the machine frame about the main axis of rotation is made possible by the movement device.

Where appropriate, an inclination of the control cabin with respect to the machine frame about the pitch axis and/or the roll axis is made possible via the movement device.

Where appropriate, a movement in translation of the control cabin with respect to the machine frame is made possible via the movement device, wherein in particular a movement in translation in or along the main axis of rotation, a parallel displacement of the control cabin with respect to the machine frame, and/or a lifting movement of the control cabin with respect to the machine frame is made possible.

Where appropriate, a gimbaled mount is provided, via which the control cabin can be inclined with respect to the machine frame, wherein two support elements are preferably provided, wherein the first support element is connected to the machine frame so as to be able to be inclined about a first axis of rotation, wherein the second support element is connected to the first support element so as to be able to be inclined about a second axis of rotation, and wherein the first axis of rotation and the second axis of rotation extend substantially orthogonally relative to one another.

Where appropriate, a parallel kinematics arrangement is provided, via which the control cabin can be inclined with respect to the machine frame, wherein the parallel kinematics arrangement is preferably formed as a three-legged support, as a hydraulic three-legged support, as a pneumatic three-legged support, as an electrically driven three-legged support, as a hexapod, as a hydraulic hexapod, as a pneumatic hexapod, or as an electrically driven hexapod.

Where appropriate, a guide device is provided, which on the one hand is coupled to the control cabin and on the other hand is coupled to the machine frame or part of the movement device, wherein the guide device is formed in such a way that a rotation of the control cabin with respect to the machine frame about the main axis of rotation, an inclination of the control cabin with respect to the machine frame about the pitch axis and/or the roll axis, and where appropriate a lifting movement in translation of the control cabin with respect to the machine frame are made possible, wherein all other degrees of freedom of the control cabin with respect to the machine frame are substantially blocked by the guide device.

Where appropriate, a rotary support is provided, which is arranged rotatably with respect to the machine frame via a rotary support bearing and a rotary support drive, and the parallel kinematics arrangement, the gimbaled mount and/or the guide device act/acts on or are provided on the rotary mount.

Where appropriate, the driving simulator is formed as a self-sufficiently movable driving simulator that can be controlled by a person from the control cabin, wherein at least one wheel drive for moving the driving simulator, a steering drive for steering the driving simulator, a movement device for the relative movement of the control cabin with respect to the machine frame and an energy store for providing the energy for the drives of the wheel drive, the steering drive and the movement device are provided in a manner connected to the machine frame so as to travel therewith and in a manner supported on the underlying surface via the wheel assemblies.

Where appropriate, an outer shell is provided, which is rigidly connected to the control cabin, the rotary support or the machine frame, and the outer shell is formed as a hollow body which at least partially, preferably completely, surrounds the control cabin, the cockpit, and/or the seat for accommodating the person.

Where appropriate, an image display area is provided on the outer shell and preferably extends over at least a majority of the field of vision of the person and preferably follows the inner face of the outer shell.

The invention where appropriate relates to a method for simulating a transition from an unaccelerated state into an accelerated state, comprising the following steps: driving and rolling the wheels of the wheel assemblies on the underlying surface, wherein the wheel axes of rotation of all wheels intersect the main axis of rotation, such that the machine frame rotates about the main axis of rotation in a first direction of rotation at a first angular speed; simultaneously rotating the control cabin about the main axis of rotation in a second direction of rotation at a second angular speed, wherein the second direction of rotation is opposite the first direction of rotation, and the second angular speed is opposed to the first angular speed, such that the control cabin remains substantially stationary and unaccelerated with respect to the underlying surface; rotating the driven and rolling wheels about the steering axis, such that at least one wheel axis of rotation, preferably a plurality of wheel axes of rotation, is/are arranged at a distance from the main axis of rotation of the control cabin, such that the control cabin is moved at least in translation and experiences an acceleration.

The driving simulator comprises a machine frame and at least three, preferably four, five, six, seven, eight or more wheel assemblies, which are coupled to the machine frame and enable a movability of the machine frame. The wheel assemblies each comprise at least one wheel, preferably two wheels. This wheel or these wheels rolls/roll on an arbitrary suitable underlying surface. At least one wheel can be driven about a wheel axis by a wheel drive. This enables a movement of the simulator. A plurality of wheels are preferably driven by a wheel drive or are each driven by a separate wheel drive in each case. Here, two wheels for example, which are both driven, can be provided per wheel assembly. The wheels of a number of, or all wheel assemblies can also be driven.

The wheel assemblies are each arranged rotatably about a steering axis. The steering axis makes it possible to adapt the direction in which the respective wheel is to roll. One steering axis is preferably provided per wheel assembly, about which steering axis the wheel or the wheels of the respective wheel assembly can be rotated. This steering axis can be formed as an actively rotated control arm, the rotation of which is driven by a rotary drive. Alternatively or additionally, the wheel assembly can also be rotated about the steering axis in that two wheels of a wheel assembly have a different speed of rotation or are driven at different speeds of rotation. A torque thus acts on the control arm and/or about the steering axis, whereby the wheel assembly is rotated.

By way of example, two wheels of a wheel assembly may each be driven by a wheel hub motor, and said wheel hub motors can be controlled separately. In order to drive both wheels of the wheel assembly in a straight line, the rotational speed of both wheels is substantially identical. In order to rotate the wheel assembly about the steering axis, the rotational speed of one wheel of a wheel assembly deviates from the further wheel of the same wheel assembly, whereby the wheels of the wheel assembly are rotated about the steering axis.

In all embodiments, where appropriate, wheels are provided which are arranged rotatably about a steering axis, but are not actively steered, but merely passively follow the direction of travel of the simulator. In this embodiment it may be advantageous for the wheels to have a certain caster in order to improve the passive steerability of the wheels. Furthermore, in all embodiments, wheels may be provided which are not driven and serve substantially for load transfer or for improved distribution of the load.

The wheels and/or the wheel assemblies are coupled to the machine frame via a kinematics arrangement. This kinematics arrangement allows a relative movement of the wheels and/or the wheel assemblies with respect to the machine frame. By way of example, the kinematics arrangement comprises a combination of a wheel suspension having a spring-damper element. This kinematics arrangement corresponds to a chassis in the technical sense. As a result of the kinematics arrangement, ground unevennesses in the underlying surface can be cushioned and damped, for example. This contributes to the decoupling of the control cabin from the underlying surface. The wheel suspension may be formed for example as a double wishbone suspension, torsion bar suspension, trailing-arm suspension, MacPherson strut axle, swing axle suspension, multi-link suspension, semi-trailing arm axle, swingarm, etc.

Where appropriate, resilient bearings can be used in order to be able to utilize elastokinematic chassis effects.

Furthermore, due to the coupling of the machine frame to at least one wheel via a kinematics arrangement, at least one degree of freedom is provided, which enables a relative movement of the machine frame with respect to the wheel and therefore with respect to the underlying surface. The kinematics arrangement may thus be used not only in order to eliminate disturbing influences of the underlying surface, but for example can also be used to incline the machine frame or for a lifting movement of the machine frame.

The movements of the machine frame with respect to the underlying surface made possible by the resilience of the kinematics arrangement can be used to represent part or all of the movement that is to be simulated. By way of example, pitch or roll movements occur in the event of acceleration changes of the simulator by the kinematics arrangement. These movements can be compensated for by the movement device. However, if these movements of the kinematics arrangement act at least partially in the same direction as the pitch or roll movement to be simulated, the movement of the control cabin with respect to the machine frame by means of the movement device may be smaller by this proportion.

Furthermore, lifting movements can also be performed at least partially by the kinematics arrangement.

Where appropriate, two wheels of a wheel assembly are connected in an articulated manner to the wheel suspension, the chassis, the control arm or the kinematics arrangement, wherein the axis of rotation of the joint is formed in such a way that the wheel loads are distributed uniformly over both wheels of a wheel assembly. By way of example, a support can thus be provided, on which there are wheels mounted one on each side. Centrally, the support has a swivel joint, via which it is connected to the wheel suspension, the chassis, the control arm or the kinematics arrangement.

The formation of a maximally effective shuffle surface depending on the driving situation and an increased driving dynamic favorable for highly dynamic driving maneuvers are also made possible by the chassis.

The machine frame is also coupled to a control cabin, on which or in which a seat for the operator is preferably located. The control cabin is coupled to the machine frame via a movement device. The movement device may be formed for example as a gimbaled mount or as a parallel kinematics device. In particular, the movement device is designed to enable a movement of the control cabin and/or of the person with respect to the machine frame.

This movability may be passive or active. In the case of an active movement, drives are used which move the control cabin and/or the person with respect to the machine frame via a suitable controller. Examples of drives of this type include parallel kinematics devices, such as three-legged supports or hexapods, which are actuated via pneumatic, hydraulic or electric drives. A further possibility is constituted by gimbaled mounts, in which case a plurality of support elements are arranged rotatably in series side by side. These support elements can be rotated with respect to one another via rotary drives or linear drives, whereby an inclination of the control cabin and/or of the person with respect to the machine frame is made possible.

A passive movability is attained for example by a resilient mounting of the control cabin on the machine frame. As a result of accelerations, such as changes in direction of the moving driving simulator, inertia forces act on the control cabin and on the machine frame. These inertia forces can be used to produce pitch movements or roll movements of the control cabin. By way of example, the control cabin may be coupled to the machine frame via a three-legged support or a hexapod formed from spring-damper arrangements. The spring or the damping characteristics of the individual resilient elements can be dynamically modified where appropriate. This can be implemented for example by control valves or by rheological fluids of variable viscosity in the damper units.

The present invention may also be formed in such a way that a guide device is provided in order to guide the movement of the control cabin with respect to the machine frame. This guide device corresponds substantially to a stringing together of individual elements interconnected in an articulated manner. Due to the type of connection of the individual elements, the guide device has a limited number of degrees of freedom. The guide device may thus be formed in such a way that pitch and/or roll movements of the control cabin are made possible with respect to the machine frame. Furthermore, a lifting movement of the control cabin with respect to the machine frame can be made possible. Here, the guide device may also be formed in such a way that the lateral movements in translation of the control cabin with respect to the machine frame are prevented. This has the advantage that mass forces acting on the movement device as a result of side acceleration forces or longitudinal acceleration forces are intercepted by the guide device. If the driving simulator is accelerated for example, the cabin is drawn rearwardly by the mass inertia force. This causes, at the point of connection between the movement device and the control cabin, on the one hand a torque about a pitch axis and on the other hand a linear inertia force, which is substantially opposed to the acceleration vector. In order to intercept horizontally extending acceleration forces of this type, a lateral or longitudinally extending parallel displacement of the control cabin with respect to the machine frame can be prevented by the guide device.

The guide device preferably has two degrees of freedom of rotation which enable the cabin to be inclined with respect to the machine frame about a pitch axis and/or about a roll axis. The connection point is formed as a universal joint where appropriate. This universal joint can be coupled to the machine frame via one or more arms. A lifting movement is thus made possible. This lifting movement has a component extending substantially parallel to a yaw axis or to the main axis of rotation. However, in the case of an arm-shaped embodiment, there is no exact linear movement made possible, but instead a lifting movement along a curved movement path.

The movement device is preferably formed in such a way that it can be rotated conjointly with the cabin. For this purpose, the movement device and where appropriate also the guide device are coupled and/or connected to a rotary support.

The rotary support is a component that enables a rotation, in particular an unlimited rotation, of the control cabin with respect to the machine frame. The components constituted by the movement device and/or guide device are preferably provided on the rotary support.

The rotary support may be basket-shaped or tub-shaped, for example. The center of gravity of the simulator can thus be kept low.

Furthermore, the rotary support may also be disk-shaped, annular, or formed as a rotary plate or as a rotary ring.

The driving simulator is preferably formed in such a way that all necessary drives and arrangements for moving the simulator and for simulation are provided in or on the self-propelled simulator. In a preferred embodiment the simulator is formed in such a way that the energy supply, in particular energy stores such as accumulators, batteries, fuel for an internal combustion engine, a generator and/or a fuel cell, etc., are provided on or in the driving simulator. The energy supply can also be provided by means of batteries and where appropriate additional (temporarily) acting energy stores, such as capacitors.

Where appropriate, an external energy source may also be provided, which for example can be formed as a loop contact, as a towing cable, as a contactless energy transfer arrangement, in particular such as an inductive energy transfer arrangement, or the like.

In order to store the energy, an energy store can be provided, which may be formed in particular as an accumulator. A plurality of energy store modules are preferably provided. These may be provided for example on the machine frame. Where appropriate, these energy stores may also be provided however on the control cabin and in particular on the rotary support. The accumulators are preferably arranged as low as possible, such that the center of gravity of the driving simulator is kept low.

In order to transfer the energy, cables are provided which extend from the energy store to the energy consumers. Energy consumers of this type are, for example, drives, control units, sensors, image display areas, data processing units such as computers, lighting systems, etc. In order to transfer energy from the machine frame to moved components, for example to the control cabin or from the machine frame to the wheels or drives thereof, loop rings may be provided in accordance with a preferred embodiment. As a result of these loop rings an energy transfer to components that have an arbitrary and unlimited rotatability is made possible.

A loop ring transfer may be provided for example between the control cabin and the machine frame and between the wheel assemblies and the machine frame.

A medium transport of a liquid media via rotary feedthroughs may also be necessary. By way of example, a cooling medium or a medium of a hydraulic system could be transferred to rotatably arranged components. By way of example, a cooling medium can be conducted to wheel drives, wherein the wheel drives are provided on the rotatably arranged wheel assemblies and the cooling pump or the heat exchanger is provided on the machine frame. Furthermore, a potentially pressurized hydraulic fluid could be conducted from the machine frame to the rotary support and in particular to the three-legged support. In this case as well the transfer may be provided via a rotary feedthrough.

Where appropriate, data or low-current signals are also transmitted via loop rings or loop feedthroughs. Control signals or signals from sensors are thus transmitted where appropriate to or from components arranged rotatably with respect to one another.

In order to transmit different data or energy flows, concentrically arranged rotary transmission arrangements, in particular such as a loop ring, rotary transmitter and/or rotary feedthroughs, can be provided.

The wheel drives in all embodiments may be wheel hub motors, for example. In accordance with a further, alternative embodiment of the wheel drives, these can be formed in all exemplary embodiments as rotary drives coupled to the machine frame which transmit the rotation via a shaft to the wheels. The shaft is arranged for example coaxially with the steering axis. The distribution of the energy over a plurality of wheels of a single wheel assembly can be implemented via a differential. Here, the wheel drive may be provided on the wheel assembly or on the machine frame. If the wheel drive is arranged on the machine frame, a universal joint is preferably provided in order to transmit the rotary energy of the drive to the wheels arranged movably with respect to the machine frame.

The control cabin of the simulator comprises a seat for a person. The control cabin also preferably comprises operator control elements 100 for controlling the driving simulator. These operator control elements 100 may replicate the operator control elements of a passenger car or of another vehicle. By actuation of these operator control elements, the simulator can be moved and controlled in the real and/or the virtual, simulated surroundings. The control cabin may be surrounded by an outer shell, which may be closed, such that the person has no external view. Sensations of the environment are illustrated in this embodiment via image display areas. This simulation is a driving simulation in a virtual computer-generated environment.

Where, appropriate, however, an external view may also be made possible, such that the person has the impression of a real environment.

At least part of the vehicle to be simulated is preferably replicated in or on the control cabin. By way of example, a replicated cockpit of a passenger vehicle may be provided on the control cabin in order to enable a realistic simulation.

Furthermore, a complete passenger vehicle may also be provided in or on the control cabin. This, however, entails the disadvantage of increased mass and thus increased inertia forces.

In all embodiments of the invention the control cabin and the outer shell are formed differently:

The control cabin can be fixedly connected to an outer shell. In this case the outer shell is part of the control cabin.

In accordance with a further embodiment, the outer shell may also be fixedly connected to the machine frame. In this embodiment the control cabin has at least one degree of freedom with respect to the outer shell. The control cabin is in this case formed as a support for the seat or as a support for the cockpit. The control cabin is the cockpit where appropriate.

In accordance with a further embodiment the outer shell may be fixedly connected to the rotary support. In this case the outer shell is conjointly rotated with the rotary support, wherein an inclination of the control cabin with respect to the outer shell about the pitch and/or roll axis or a lifting movement is possible. In this case as well the control cabin can be formed as a support for the seat or as a support for the cockpit, or the control cabin is the cockpit where appropriate.

The outer shell may be closed in order to prevent an external view.

The outer shell may have openings in order to enable viewing.

The outer shell may also be omitted where appropriate, whereby a free external view is provided.

The outer shell may be formed where appropriate in such a way that it is self-supporting.

The outer shell is formed where appropriate in such a way that further components, such as projectors for the image display area, the cockpit, or further components, such as audio playback devices, data processing arrangements, in particular such as computers, etc., can be secured to the outer shell, or such that the outer shell is designed to carry these components even at increased acceleration.

A few terms will be defined hereinafter for improved clarity.

The axes in vehicle or chassis development known to a person skilled in the art are defined as follows:

The pitch axis corresponds to a view directed straight ahead with respect to the viewing direction of the operator and/or axis extending transversely with respect to the longitudinal axis of the simulated vehicle. A pitch movement of a real or simulated vehicle about the pitch axis is caused for example by an acceleration or a deceleration in a straight line.

The roll axis extends substantially in the longitudinal direction of the simulated vehicle and thus substantially parallel to the viewing direction of the operator with their view directed straight ahead. An inclination of the vehicle about the roll axis occurs for example when negotiating bends, when the outer wheel suspension yields. This movement is also known to a person skilled in the art as rolling.

The yaw axis corresponds substantially to the vertical axis of the simulated vehicle or the person. A rotation about the yaw axis occurs for example when negotiating bends.

These axes are not defined absolutely rigidly with respect to the driving simulator, the simulated vehicle, the control cabin or the operator, since the position of the axes may change due to dynamic relative movements of individual components.

In the case of the simulator according to the invention, these axes are defined as fixed axes with respect to the person or the cockpit or the control cabin. If the control cabin is substantially fixedly connected to the outer shell, the definitions of the axes also apply to the outer shell.

Pitch movements, roll movements and yaw movements of the person can be freely simulated by the device according to the invention within the scope of the kinematic possibilities.

The invention will now be described in greater detail on the basis of the figures.

DESCRIPTION OF THE INVENTION

Figure 1:
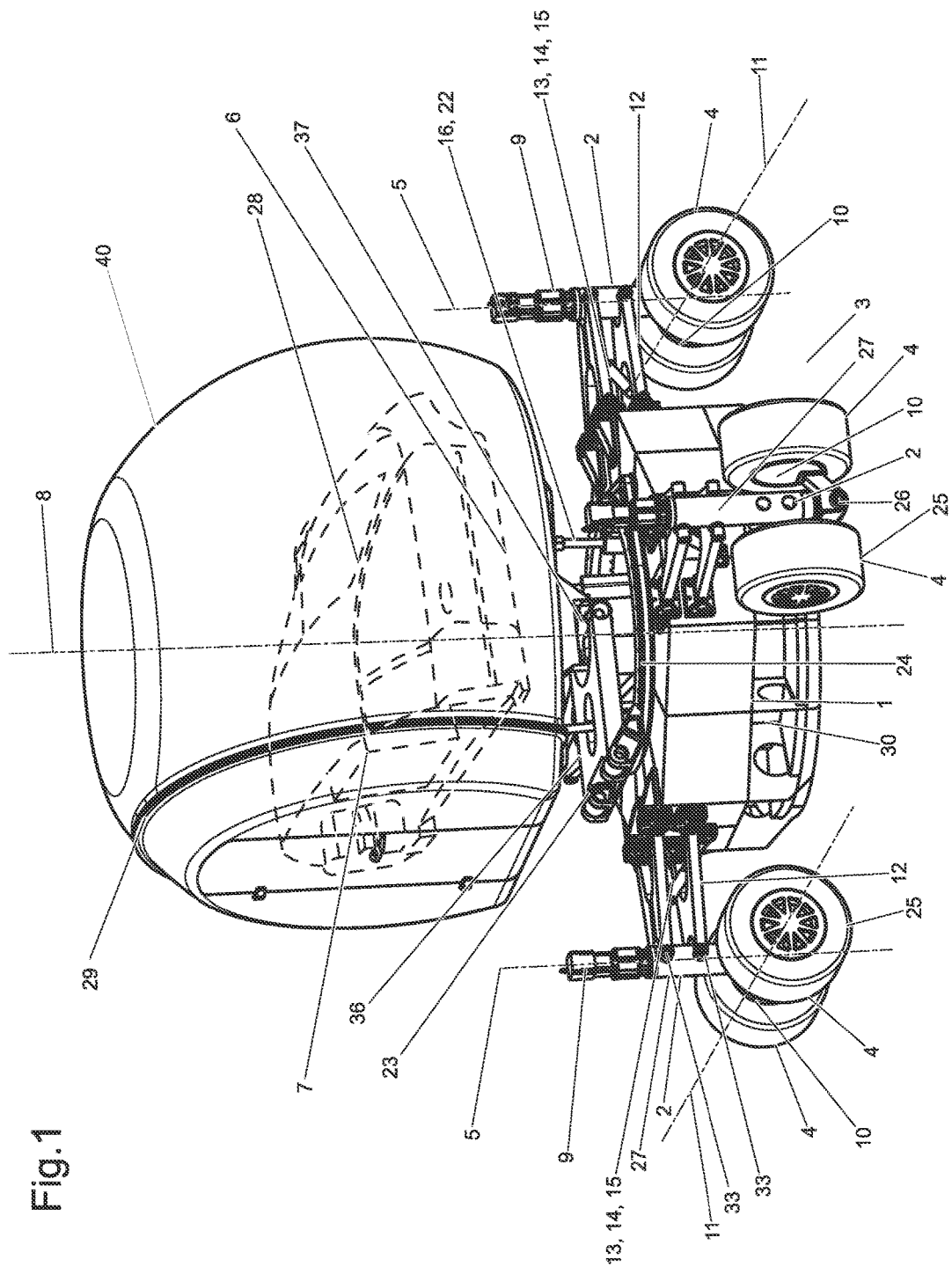
FIG. 1 shows a schematic oblique view of an embodiment of the driving simulator according to the invention.

FIG. 1 shows an embodiment of a simulator according to the invention having a machine frame 1, four wheel assemblies 2, a control cabin 6, which is connected or coupled to the machine frame 1 via a movement device 16. The wheel assemblies 2 in the present embodiment each comprise two wheels 4. These wheels may be driven where appropriate about their wheel axis 11. The wheels of at least one wheel assembly are driven. The wheels of two, three or more wheel assemblies are preferably driven. In accordance with the invention, in embodiments in which two wheels 4 are provided per wheel assembly 2, both wheels 4 can be driven jointly by a wheel drive 10 or separately from one another by independent wheel drives 10.

The wheels of a wheel assembly 2 can be pivoted or rotated about the steering axis 5 via a steering drive 9. This pivotability or rotatability is preferably unlimited in both directions. The direction of travel of the individual wheel assemblies can be selected and controlled as a result of this movement about the steering axis 5. The steering drive 9 as in the present embodiment may be formed as a rotary drive, by means of which the position of the wheels 4 and of a control arm 27 can be changed.

In accordance with a further embodiment (not illustrated), the rotation of the wheels 4 about the steering axle 5 can also be obtained by controlling rotational speed differences between the two wheels 4 provided on a wheel assembly 2. By way of example, each of the two wheels of a wheel assembly 2 is driven by a wheel drive. Wheel hub motors are preferably used. As a result of rotational speed differences between the two wheels of a wheel assembly, different driving paths are produced, and therefore a steering torque of the two wheels about the steering axis 5 is produced. In an embodiment of this type an active steering drive as independent drive can be omitted or can be supported by the wheel drives.

The wheel assemblies and/or the wheels 4 are coupled to the machine frame 1 via a kinematics arrangement 12. This kinematics arrangement preferably comprises resilient and damping elements 13, in particular a spring-damper arrangement 14 and a wheel suspension 15. Furthermore, the kinematics arrangement may comprise a wheel support 26, which is provided pivotably on the control arm 27 in order to produce a uniform distribution over both wheels 4 of the forces acting on the wheel assembly 2.

The wheel support 26 is provided here on the control arm 27 so as to be pivotable about an axis of rotation. The axis of rotation of the wheel support 26 relative to the control arm 27 by way of example extends horizontally or in a manner deviating slightly from the horizontal direction.

Furthermore, the simulator according to the invention comprises a control cabin 6. A cockpit 28 of the vehicle to be simulated is provided on this control cabin 6 and is sketched schematically. This cockpit 28 is for example the front part of a passenger car, a replica of a front part of a passenger car, a replica of an entire passenger car, a driver's cab of any vehicle, a replica of a driver's cab of any vehicle, and in particular comprises a seat and operating elements, such as a steering wheel, an accelerator pedal, and a brake.

This cockpit 28 preferably can be secured rigidly to the control cabin 6. However, in order to replace the cockpit 28, a closable opening 29 in the outer shell 40 can be provided, through which different cockpits can be introduced onto the control cabin and into the outer shell or can be removed therefrom. Furthermore, the opening may also be closed by a door in order to enable an operator to enter and exit.

The outer shell 40 is formed in the present embodiment substantially as a closed hollow body which has a closable opening. The operator is substantially shut off from the outside world as a result of this embodiment. Visual or acoustic impressions can be simulated via artificially generated images or noises. An image display area is preferably provided in the outer shell 40, via which image display area a virtual environment can be shown. This display area can be formed for example as a flatscreen area or as a projection area. In the embodiment as a projection area one or more video projector(s) can be provided in or on the control cabin 6 or in the outer shell.

The outer shell where appropriate has openings which enable a real external view. A movement in the real environment can thus be simulated.

The simulator according to the invention preferably comprises one or more energy stores 30. These may be formed for example as fuel tanks, batteries or as accumulators. The energy store 30 serves to drive the different drives in order to move the simulator and in order to supply other consumers, such as image display apparatuses, controllers, data processing apparatuses, etc. Where appropriate, a quick-change arrangement having an external charging station can be provided for the energy storage modules in order to enable continuous operation so to speak.

Furthermore, drives may act as generators during braking procedures in order to recover at least some of the braking energy and/or to convert this into electrical energy. This electrical energy may then be stored for example in the batteries, accumulators or the temporary energy stores. This increases on the one hand the efficacy and the scope of the simulator, and on the other hand improves the dynamic wheel kinematics, since sufficient energy is available for the highly dynamic drive of the wheels at any moment in time.

Where appropriate, the simulator may also be fed by an external energy source. By way of example, a towing cable or loop contacts may lend themselves for this purpose.

The illustrated embodiment has a movement device 16, which comprises a parallel kinematics arrangement 22. This parallel kinematics arrangement 22 is formed in the present embodiment as a three-legged support or what is known as a tripod. The simulator according to the invention also comprises a guide device 23. This guide device 23 serves in particular to guide the movement of the control cabin 6 with respect to the machine frame 1 or with respect to the rotary support 24. In the present embodiment a number of degrees of freedom are blocked by the guide device 23. A rotary support 24 is provided in order to rotate the control cabin 6 with respect to the machine frame 1. This rotary support 24 comprises at least one rotary support drive 31 and a rotary support bearing 32.

The rotary support 24 preferably enables a rotation of the control cabin 6 with respect to the machine frame of 360°, and particularly preferably an arbitrary, a continuous and/or an unlimited rotatability of the control cabin 6 with respect to the machine frame 1, in particular in both directions of rotation, is made possible.

The same is preferably true for the rotatability of the wheels 4 of the wheel assemblies 2 about the respective steering axis. In accordance with a preferred embodiment, these may also be rotated about the steering axis over 360°, arbitrarily, continuously and/or in an unlimited manner, in particular in both directions of rotation.

This special configuration of the infinitely rotatable elements makes it possible for the machine frame 1 to rotate about a main axis of rotation 8, wherein at the same time the control cabin 6 remains still or is positioned in a stationary manner. This brings advantages in the case of the solution to the problem according to the invention, in particular with the improvement of the dynamic wheel kinematics, which also includes the fact that the wheels can be accelerated in any position or in any driving situation of the simulator and do not block one another, for example due to a kinematic singularity.

The control cabin 6 rotates with respect to the machine frame 1 preferably about the main axis of rotation 8. The main axis of rotation 8 is preferably a normal vector of a plane spanned by the wheel contact faces 25 on the underlying surface 3. This plane thus corresponds substantially to the underlying surface 3. The main axis of rotation 8 thus extends substantially vertically when the underlying surface is horizontal.

In accordance with a preferred embodiment the steering axes 5 also extend substantially vertically and preferably parallel to the main axis of rotation when the underlying surface is horizontal.

The wheel axes 11 of the wheels 4 preferably extend substantially horizontally. However, the inventive concept also includes the case in which the axes deviate from the horizontal or vertical direction. In particular, the steering axes 5 may be slightly inclined, for example in order to provide a caster. The wheel axes 11 may be slightly inclined relative to one another, for example in order to provide a wheel camber.

Figure 2:
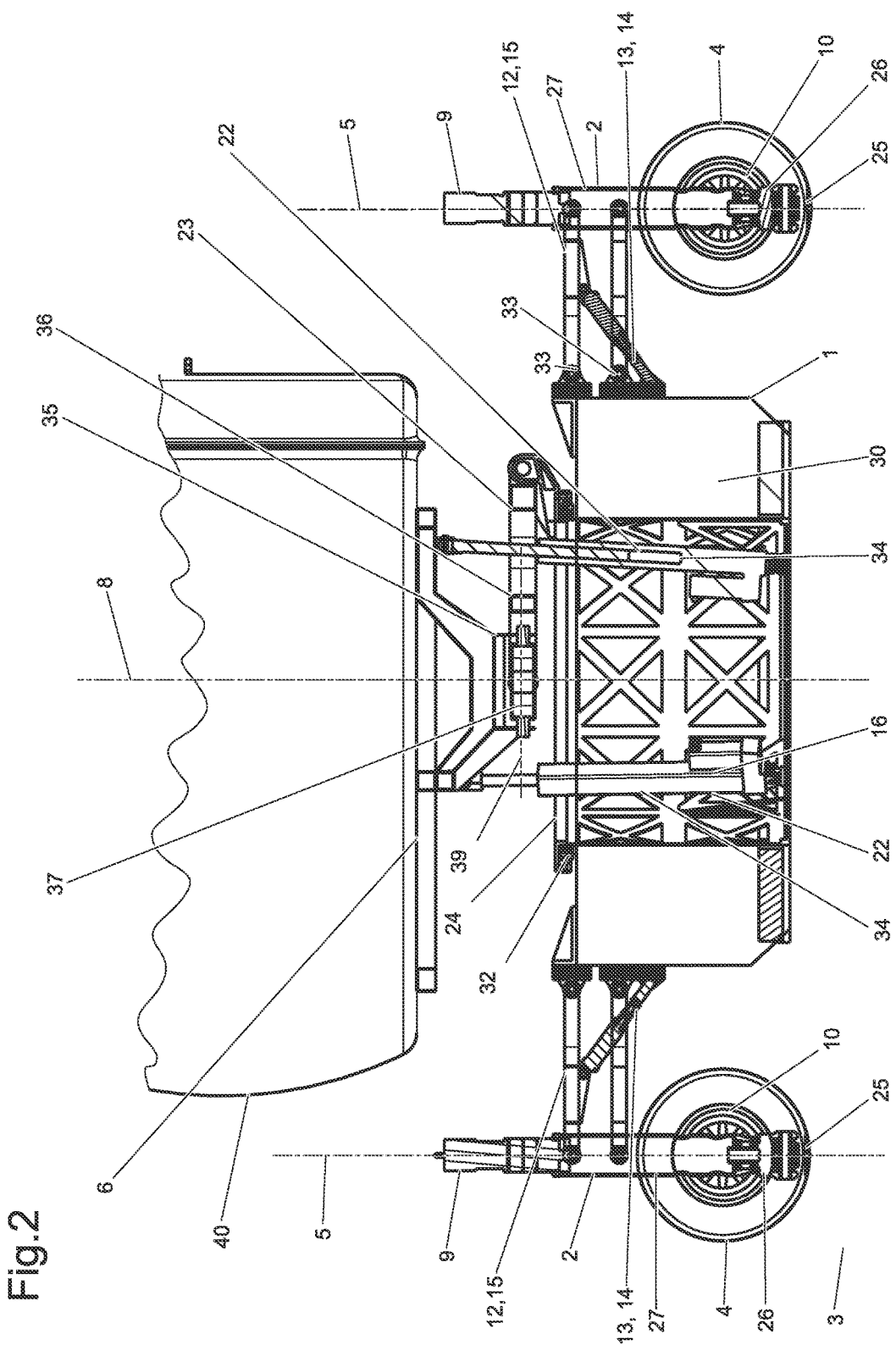
FIG. 2 shows a sectional illustration of a driving simulator according to the invention.

FIG. 2 shows a schematic sectional illustration of a device according to the invention corresponding substantially to the device from FIG. 1. The self-propelled driving simulator comprises a control cabin 6, which is coupled to a machine frame 1 via a movement device 16. The machine frame 1 can move and is supported on the underlying surface via wheel assemblies 2. The wheel assemblies 2 preferably each comprise at least one wheel 4, which rests on the underlying surface 3 via a wheel contact face 25. At least one wheel 4 is driven via a wheel drive 10, such that the simulator can be moved by this driving wheel. The wheel 4 of the wheel assembly 2 is also coupled to a control arm 27, which is preferably rotatable about a steering axis 5. A steering drive 9 is provided in order to rotate the control arm 27 about the steering axis 5. As described in the previous embodiment, this steering drive may be formed as an independent rotary drive, or, in the case of a plurality of wheels 4 per wheel assembly, may also be formed by rotational speed differences between the individual wheels.

In the case of a plurality of wheels 4 per wheel assembly 2, the wheels 4 can be coupled to the machine frame via a wheel support 26. This wheel support by way of example is pivotable with respect to the guide 27 in order to provide a uniform load transfer of the wheels. The wheels 4 are coupled to the machine frame via a kinematics arrangement 12. This kinematics arrangement 12 preferably comprises resilient and/or damping elements 13, which in particular are formed as a spring-damper arrangement 14, and also a wheel suspension 15. In the present embodiment the wheel suspension 15 is formed as a double wishbone wheel suspension. The wheel suspension serves to allow the wheels to move with respect to the machine frame 1. In order to delimit the movability, a spring-damper arrangement 14 is provided. In the present embodiment the spring damper arrangement 14 is formed as a pullrod configuration. However, pushrod embodiments or alternative configurations are also possible.

The kinematics arrangement 12 comprises a number of bearings 33. These bearings may be formed in part as resilient bearings where appropriate. The chassis is thus provided with elastokinematic properties.

In the present embodiment the two wishbones extends substantially parallel. However, other configurations are also possible. By way of example, the wishbones may be positioned at an angle to one another.

In the present embodiment both wishbones extend substantially horizontally. In accordance with a further embodiment one or both wishbones may also be positioned at an incline.

The control cabin 6 is coupled to the machine frame 1 via a movement device 16. In the present embodiment the movement device 16 comprises a parallel kinematics arrangement 22 and a rotary support 24. The rotary support 24 is basket-shaped in the present form and extends from the upper region of the machine frame 1 to a lower region of the machine frame. The rotary support is substantially tub-shaped. The parallel kinematics arrangement 22 is mounted on the bottom of the tub, which in the present embodiment is lower than the collar of the tub. This configuration provides advantages in the solution to the problem according to the invention, in particular due to a lower position at the center of gravity.

The rotary support 24 is mounted rotatably on the machine frame 1 via a rotary support bearing 32 and can be driven via a rotary support drive 31 (not illustrated). The parallel kinematics arrangement 22 comprises a plurality of linear drives 34, which are coupled to the control cabin 6. Due to a different length change of the individual linear drives 34, the control cabin 6 can be inclined or moved. Due to a simultaneous retraction or extension, a lowering movement or a lifting movement of the control cabin can be attained with respect to the machine frame and subsequently with respect to the underlying surface 3 where appropriate. The control cabin 6 in particular comprises a control cabin support 35, which on the one hand is fixedly connected to the outer shell of the control cabin and on the other hand is acted on by the movement device. However, this control cabin support 35 can be omitted where appropriate, in particular when the control cabin is formed as a self-supporting control cabin or when the control cabin and the control cabin support are formed as a self-supporting cockpit.

The simulator according to the invention also comprises a guide device 23. This guide device 23 is fixed on the one hand to the rotary support 24 and on the other hand to the control cabin 6. The guide device 23 comprises individual elements connected to one another in an articulated manner, which have a certain movability or certain degrees of freedom. In the present embodiment the guide device 23 comprises a main arm 36 and a universal joint 37. The main arm 36 is connected to the rotary support 24 in an articulated manner. The axis of rotation of this joint extends substantially in a horizontal plane. The illustrated main arm has just one degree of freedom of rotation with respect to the rotary support 24.

However, the main arm 36 may also be formed where appropriate as a double-jointed arm, in which two main arms are connected to one another similarly to a knee joint.

At the free end of the main arm 36, at which this is not connected to the rotary support 24, the main arm engages with a universal joint 37. This universal joint 37 is connected to the main arm 36 pivotably about a first universal joint axis 38. The universal joint 37 also has a second universal joint axis 39, about which the universal joint 37 is pivotably connected to the control cabin 6. The control cabin is thus substantially pivotable or inclinable with respect to the machine frame 1 about the first universal joint axis 38 and the second universal joint axis 39. The first universal joint axis 38 and the second universal joint axis 39 preferably correspond substantially to the pitch axis and the roll axis of the person in the control cabin 6. The kinematic embodiment of the guide device 23 also allows a lifting movement of the control cabin with respect to the machine frame 1. This lifting movement extends in the present embodiment along a curved path, which in particular is determined by the arm length of the main arm 36. In an embodiment of the main arm as a double-jointed arm, however, a linear lifting movement may also be performed, in particular along the main axis of rotation 8.

Further degrees of freedom for the movement of the control cabin with respect to the machine frame 1 are substantially blocked by the guide device 23. This has the positive effect that horizontally acting mass inertia forces, as act on the movement device in particular in the event of acceleration or deceleration of the simulator, are intercepted by the guide device. The dimensioning of the movement device can thus be optimized. This has a positive effect on the overall weight of the simulator and thus helps in the solution of the problem according to the invention.

Figure 3:
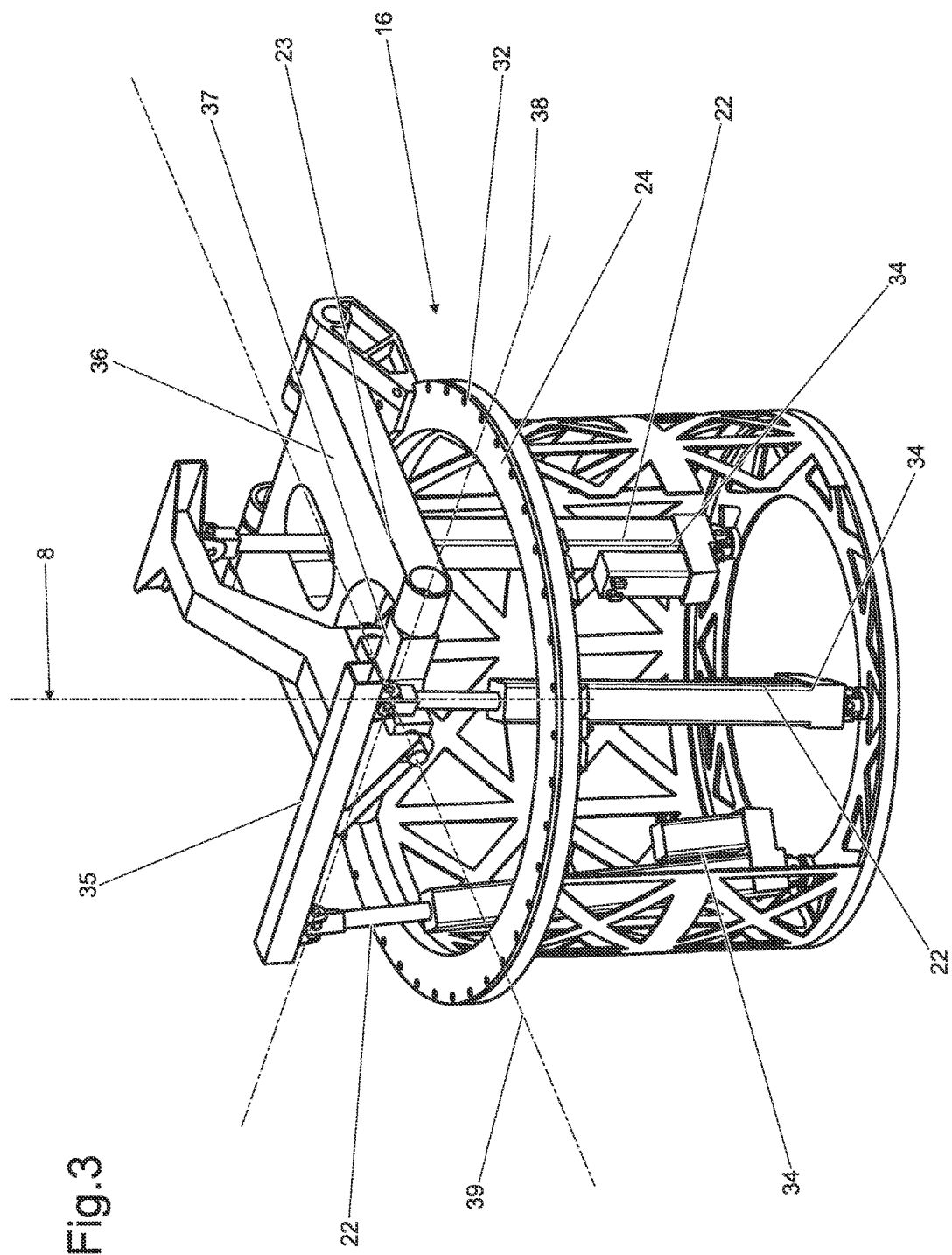
FIG. 3 shows a detail of the movement device in an oblique view.

FIG. 3 shows a detailed oblique view of the movement device 16, the guide device 23 and the rotary support 24. The rotary support 24 is basket-shaped or tub-shaped as in the previous embodiments. The wall of the rotary support 24 located at the front in this illustration is blanked out in order to improve the clarity of the view of the parallel kinematics arrangement 22. The rotary support 24 is basket-shaped or tub-shaped in the present embodiment, wherein at least parts of the rotary support 24 may be formed in a framework manner in order to save weight. The rotary support 24 is a substantially rigid body, which is arranged rotatably with respect to the machine frame via a rotary support bearing 32. The rotary support bearing 32 has a stationary part, which for example is coupled or fixedly connected to the machine frame 1. The movable part of the bearing is fixedly connected or coupled to the rotary support 24.

The movement device 16 is provided on the rotary support 24. In the present embodiment this comprises a parallel kinematics arrangement 22 which, as described in the previous exemplary embodiments, is formed as a three-legged support or tripod. This comprises a plurality of linear drives 34, which are connected on one side to the rotary support 24 and on their other side act on the control cabin 6 or on the control cabin support 35. The individual linear drives 34 of the parallel kinematics arrangement 22 are connected to the rotary support 24 and to the control cabin 6 at points distanced from one another. In the event of a different movement of the linear drives 34, an inclination or pivoting of the control cabin 6 can thus be implemented, wherein this pivotability occurs substantially about the roll axis and/or about the pitch axis. For a rotation of the cabin about the vertical axis, i.e. the yaw axis, which in the present embodiment preferably corresponds to the main axis of rotation 8, the entire rotary support 24 is rotatable about the main axis 8. The guide device 23 is also provided on the rotary support 24. The guide device 23 in particular comprises a main arm 36 and a universal joint 37. The main arm 36 has substantially one degree of freedom, which enables a lifting movement of the control cabin 6 with respect to the machine frame 1. A universal joint 37 is hinged to the main arm 36 and is connected to the main arm 36 so as to be pivotable about a first universal joint axis 38. The pivotable universal joint 37 is also connected to the control cabin 6 or to the control cabin support 35 of the control cabin 6.

Figure 4A:
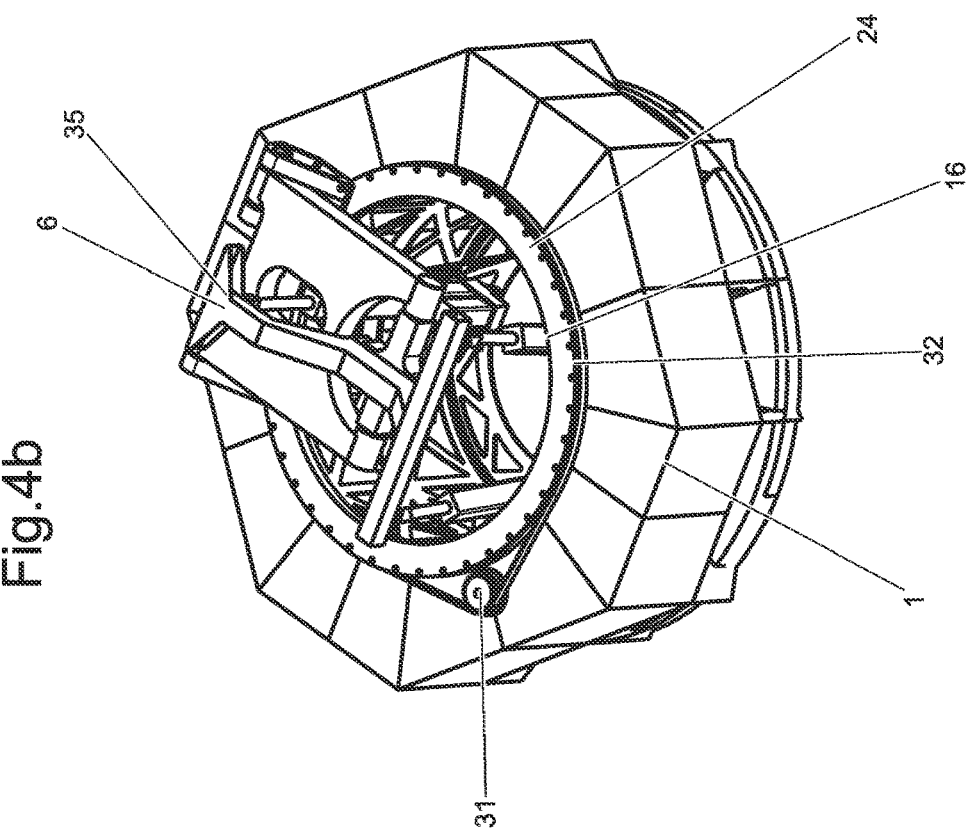
FIGS. 4a and 4b show details of the movement device and in particular of the rotary support.
Figure 4B:
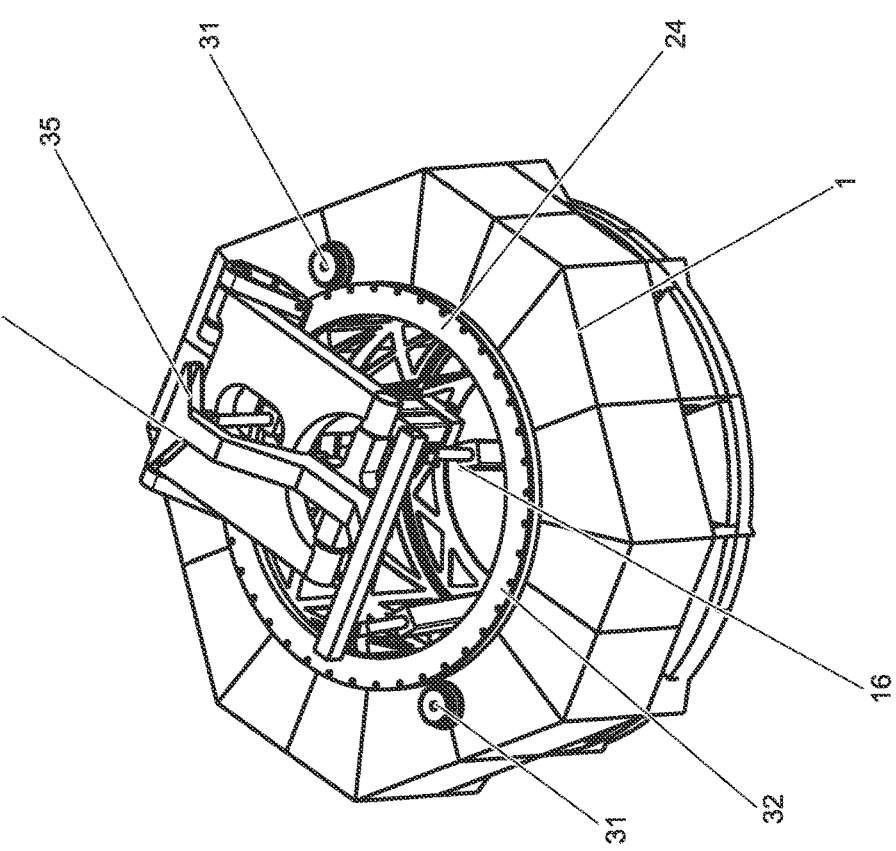

FIGS. 4*a* and 4*b* show two different embodiments of a rotary support drive 31. The control cabin 6 or control cabin support 35 thereof is coupled to the machine frame 1 via a movement device 16. In particular, this coupling is provided via the rotary support 24. The rotary support 24 is provided on the machine frame 1 rotatably about the main axis 8. In order to enable the rotation, a rotary support bearing 32 is provided. A rotary support drive 31 is provided in order to drive the rotation of the rotary support 24.

In FIG. 4*a* the rotary support drive is formed as a pinion drive, which rotates the rotary support 24 via a rotated wheel or pinion. Here, the pinion or the driving wheel may act directly on an outer side of the rotary support in order to transfer a rotary movement.

In FIG. 4*b* the rotation is transferred from the rotary support drive 31 to the rotary support 24 via a belt. This may be formed as a smooth belt, as a toothed belt, as a V-belt, as a chain drive or as a similar transfer means.

Figure 5:
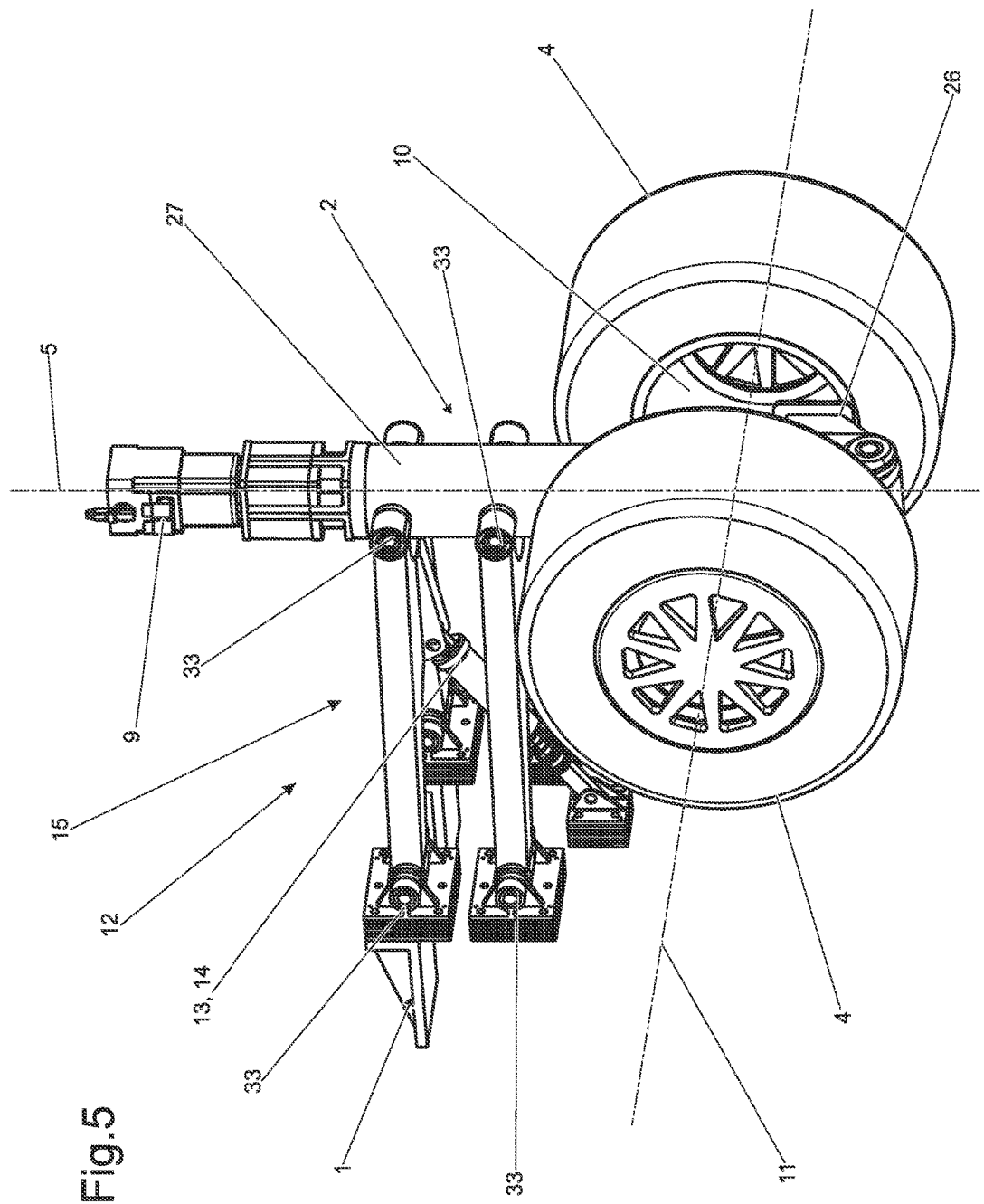
FIG. 5 shows an exemplary embodiment of a kinematics arrangement.

FIG. 5 shows a schematic side view of a detail of a wheel assembly 2 having wheels 4 and a kinematics arrangement 12. This corresponds for example to a wheel assembly of the embodiments according to FIG. 1 to 4 or 6. In the present schematic illustration, two wheels 4 are provided per wheel assembly 2. These are driven individually or jointly as appropriate, via a wheel drive 10. In any case, the wheels 4 are arranged rotatably about a wheel axis 11 in order to enable the simulator to move on the underlying surface 3. In accordance with a preferred embodiment the wheels 4 are connected to the control arm 27 via a wheel mount 26. Where appropriate, the wheel bearings of the wheels 4 act directly on the control arm 27 in an alternative embodiment. In the present embodiment a pivotable wheel mount 26 is provided in order to distribute the load transfer uniformly between both wheels. The control arm 27 serves to rotate the wheels about the steering axis 5. This rotation is caused in particular by a steering drive 9. As described in the previous embodiments, an independent steering drive can be provided for this purpose. In accordance with a further embodiment the wheels may also be steered for example via rotational speed differences between the individual driven wheels.

The kinematics arrangement 12 preferably comprises a wheel suspension 15 and resilient and/or damping elements, such as a spring damper arrangement 14.

Figure 6:
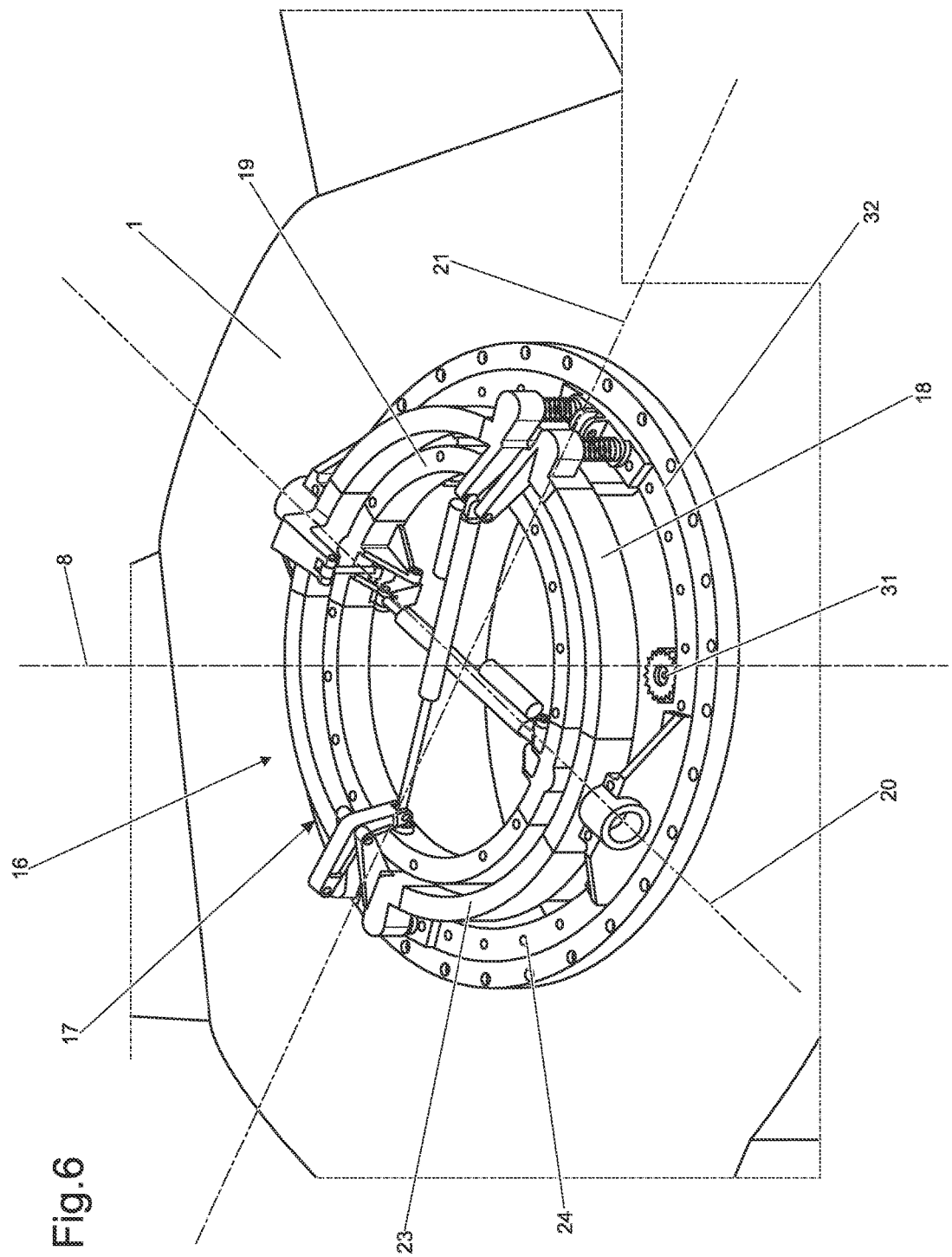
FIG. 6 shows a further embodiment of a movement device according to the invention.

FIG. 6 shows a further embodiment of a movement device 16 for coupling the control cabin 6 to the machine frame 1. This may replace the parallel kinematics arrangement or the guide device in all embodiments. In the present embodiment the movement device 16 comprises a first support element 18, which is coupled to the machine frame 1 pivotably about a first axis of rotation 20. In particular the first support element 18 is connected to the rotary mount 24 pivotably about the first axis of rotation 20. A second support element 19 is connected to the first support element 18 rotatably about a second axis of rotation 21. The movement device 16 is formed in this embodiment as a gimbaled mount 17. The individual support elements 18, 19 can be inclined or rotated with respect to one another and with respect to the machine frame or the rotary mount 24 via rotary drives or linear drives. The control cabin 6 connected to the second carrier element 19 can thus be inclined about two axes of rotation. This enables an inclination of the control cabin 6 about the pitch axis and/or the roll axis.

Figure 7:
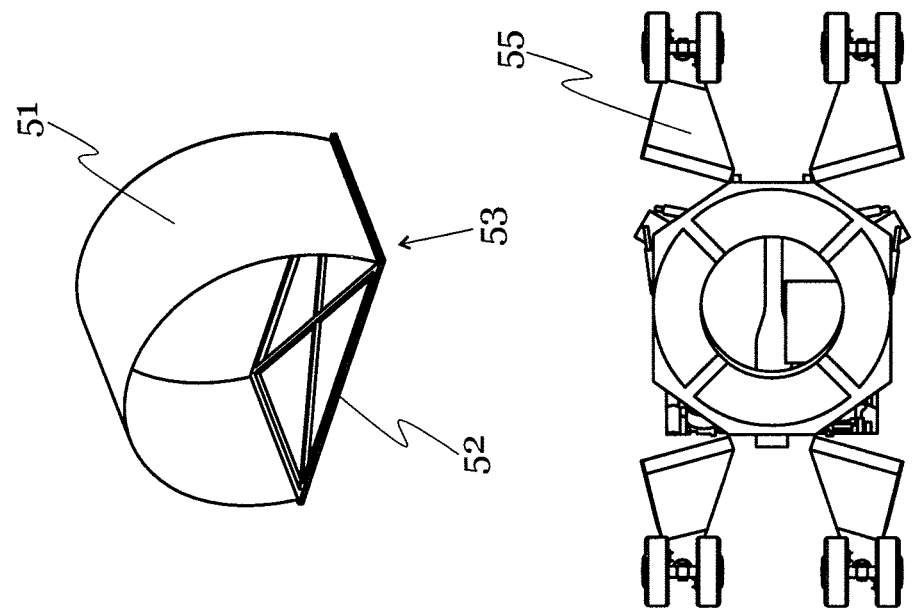
FIG. 7 shows four views of components for improving the transportability.
Figure 7:
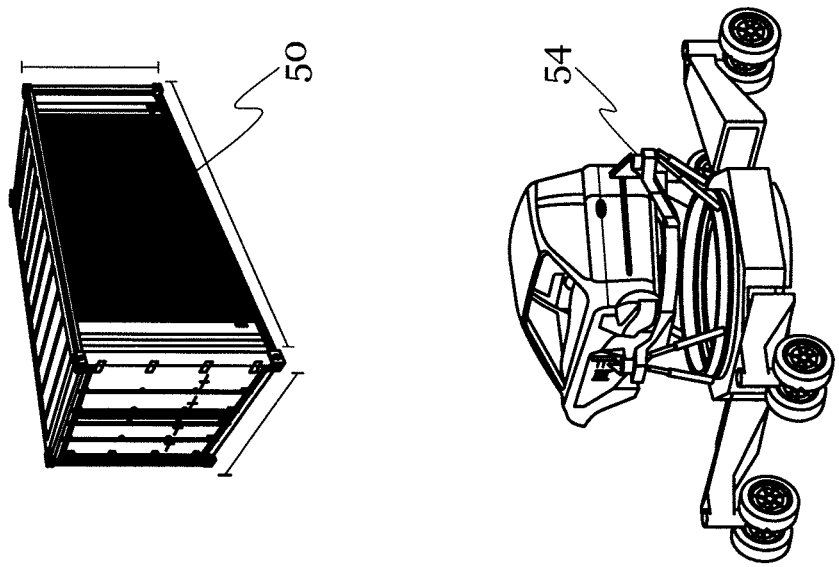

FIG. 7 shows a 20-foot container 50 having internal dimensions: 5.710 m/2.352 m/2.385 m, a sliding tarpaulin swap body: internal dimensions: 7.3 m/2.480 m/2.465 m and dimensions of a width of 8 feet, a depth of 20 feet, and a height of 8 feet. A projection screen 51 with a transport frame 52 is also illustrated, wherein the projection wall has dimensions of 3.5 m/2.2 m/2 m. A platform having a tripod body is also illustrated: having dimensions of 5.06 m/2.235 m/2.4 m. In addition, a foldable chassis 55 is illustrated. The driving simulator can be operated both for operation in an indoor hall (defined, flat underlying surface) and in the open on a test ground (uneven underlying surface, weathering, dirt, etc.). The changing use on different outdoor area arrangements and the test hall may require simple, secure transport and also loading and unloading of the transport means. Separate transport should be avoided. More specifically, simple transport by means of a truck may be possible. The loading and unloading can be performed via a ramp or, when a container is used, by means of a crane. For the driving simulator this means a preferably star-shaped embodiment of the chassis, that the arms of the star can be folded in, and the dome of the projection can be removed. In other words, the driving simulator can be dismantled or deformed into correspondingly small parts. In addition, it is helpful to enable simple handling by means of lightweight construction. Devices for the loading process and for the dismantling or assembly may be required. It should be possible to quickly establish the respective connections and yet still ensure the corresponding stability and safety during operation.

In all embodiments the simulator may have a transport mode, in which the following steps are performed: the wheels are folded in; the chassis is locked in the transport position; the cabin is disassembled where appropriate. The width of the vehicle in the transport position is for example less than 3000 mm, in particular approximately 2630 mm. It may be appropriate to leave the cabling and the hydraulics intact.

Figure 8:
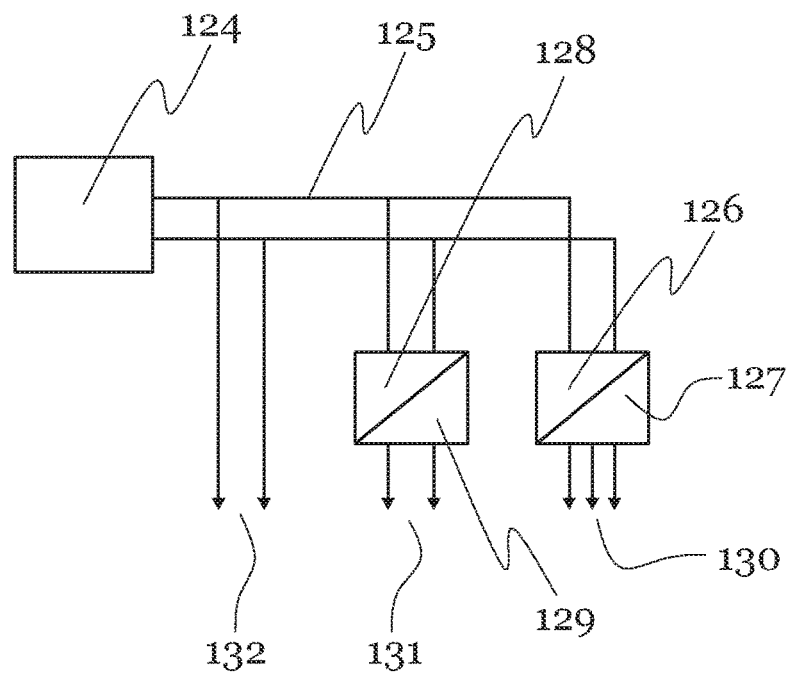
FIG. 8 and FIG. 9 show details of the energy supply of the device.

FIG. 8 shows a circuit diagram of the battery voltage and the on-board voltage and in particular a battery 124, a line having a voltage of >750 V, a DC 128/DC 129 component having a voltage 131 prevailing thereafter of 24V DC and a DC 126/AC 127 module having a voltage 130 prevailing thereafter of 400 V AC and motors 132.

Figure 9:
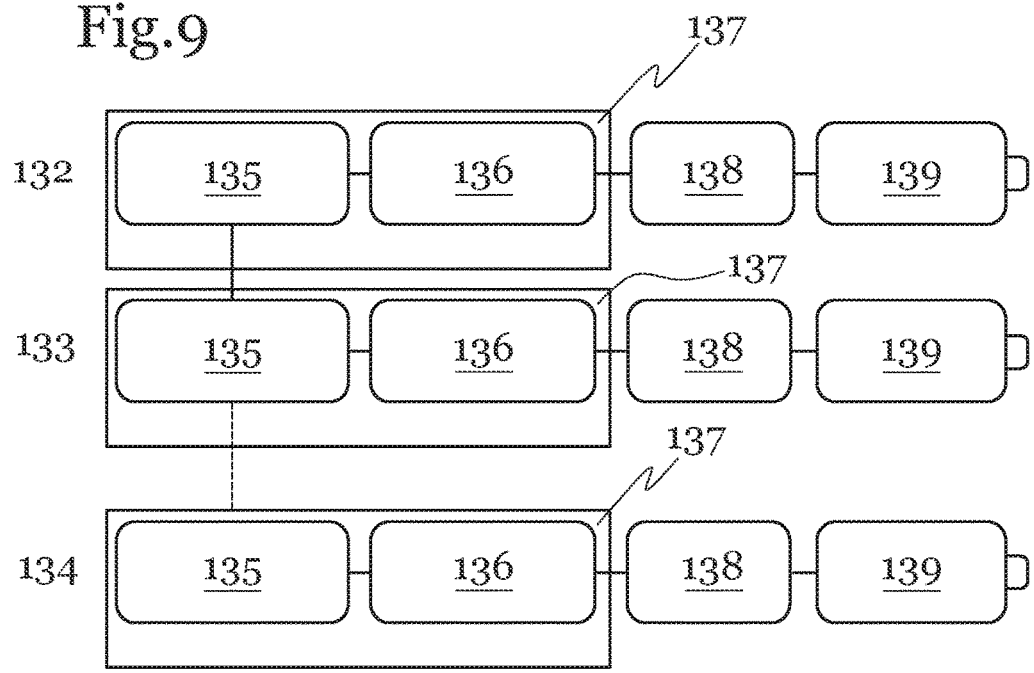

FIG. 9 shows a schematic illustration with an arm 1 132 an arm 2 133, an arm N 134, wherein the arms each comprise an energy supply 137 with an accumulator 135 and (super) ultra-caps 136 and an inverter 138 and an e-motor 139.

Exemplary Embodiment of the Batteries in Particular According to FIG. 8 and/or FIG. 9:

The basic supply is provided by rechargeable accumulators (batteries), which can be changed during a temporary interruption to operation. With a corresponding number of replacement accumulators, a continuous/long-term operation of the simulator can thus be ensured. In contrast to the prior art, the driving simulator may therefore be independent of external energy feed, whether by towing cable, loop contacts, cables or other arrangements, during driving mode. The supply by accumulators, compared with internal combustion engines, provides advantages in terms of exhaust gas behavior in enclosed spaces, the vibrations and noise that are usual in combustion engines, and the entrained fuels. The use of electrical drive energy also provides advantages in terms of direct drive of the tires by wheel hub drives integrated in the wheels, which are controlled in both directions both in driving mode and in braking mode, i.e. are used in full 4-quadrant mode. The energy removed from the drives in braking mode is preferably to be stored fully, preferably electrically, and is to be provided for the next acceleration cycle. For example, ultracaps or accumulators can be used as suitable additional energy stores. A self-sufficient energy supply additionally enables the transport and use of the simulator on different driving surfaces, even if these have no infrastructure with respect to the energy supply.

Exemplary Structure:

A possible structure of the electrical drive system with associated energy store is illustrated in the figures. Here, the ultra- or super-caps are used for the intermediate storage/voltage smoothing of the continuously alternating energy flow. This is justified by the operating strategy. Each arm of the star (or each wheel nacelle) has an associated accumulator. The individual accumulators, however, are connected in parallel. This construction enables minimal paths of the energy flow and makes it possible to compensate for possible states of charge of the accumulated during travel.

Exemplary Embodiment of the Driving Surface/of the Movement Space:

Further requirements are placed on the construction of the driving simulator in the case of outdoor operation. In addition to the compact lightweight design, a certain robustness and resistance are required. A self-sufficient drive system and a safety concept which also function outdoors are advantageous.

Since the driving simulator might not be dependent on any fixedly installed supply arrangements, it can be used on any sufficiently flat, sufficiently large driving surface equipped with a suitable covering. In particular, in contrast to use on surfaces that are under cover, use on much large driving surfaces (of practically any size) may benefit from a much larger movement space.

Exemplary Embodiment of the Safety Concept, of the Controller:

Exemplary Embodiment—Emergency Braking:

In the case of a dangerous situation (simulator out of control, simulator close to a boundary), the simulator must be brought to a standstill with the drives switched off. The delay by the emergency braking must not be so great that additional risks are posed as a result. Mechanical brakes of the individual wheel units and other braking devices, such as brake sacks and spring-loaded brake rails, constitute potential implementations. These variants will be considered in detail hereinafter.

Exemplary Embodiment—Shutdown Via braked Wheels:

In normal operation the wheel units transfer the longitudinal and transverse forces of the tires via the chassis to the central vehicle frame, on which the structure with the driver sits. Depending on whether each wheel unit is steered via separate control of the two wheel drives or an additional steering drive, the driving behavior can be controlled only with difficulty when all drives are switched off and the wheels are braked (mechanical braking, auxiliary energy). A caster of the wheel units provided by the special chassis construction may possibly stabilize the wheels in the driving direction, if the wheels are not blocked. A blocking of the wheels, and therefore approximately identical braking force longitudinally and transversely to the wheel, and therefore independence of the steering angle may enable the emergency shutdown in a positive manner. The delay would then correspond to the maximum circumferential force/transverse force of the tire/carriageway combination that can be generated at 100% slip.

Exemplary Embodiment—Shutdown Via Brake Shoe/Brake Plate:

Here, the anisotropic braking effect of a braked wheel, which is possibly still rolling, in the longitudinal and transverse direction is overridden and an isotropic force transfer element is used for this between driving simulator and underlying surface. The force transfer element is a plate having a frictional covering matched to a certain delay, via which covering the simulator skids on the underlying surface instead of rolling via the tires. The contour of the contact face should be as large as possible due to the required security against tilting; the contact face must be specific (flatness of the underlying surface) and should transfer defined forces (coefficient of friction). The transition from driving mode with rolling tires to braking mode with sliding brake plate(s) can be made in particular by means of two mechanisms:

the brake plates lift the simulator, or
the wheels are retracted for example via the chassis and the simulator sits on the brake plates.

Trigger logic and trigger mechanisms are to be formed accordingly on the basis of a safety design method.

Exemplary Embodiment—Shutdown Via Brake Sacks:

The braking effect is generated by inflatable brake sacks which are mounted below the chassis. When triggered, the sacks (but at least one) are filled with air in a short space of time by means of a fail-safe auxiliary arrangement (filled pressure stores with valve) and produce a corresponding frictional effect relative to the road surface. This device can be used alone or in combination with, or in order to assist the above-mentioned braking devices.

The movement device in accordance with a further embodiment may be passive or semi-passive. In this embodiment the mass forces occurring as a result of the movement of the driving simulator and in particular as a result of the acceleration of the driving simulator are used in order to enable bending or rolling movements of the control cabin 6 with respect to the machine frame 1. The gimbaled mount or the parallel kinematics arrangement can thus be formed in such a way that a movability of the control cabin with respect to the machine frame is made possible by the fundamental kinematics arrangement. By means of resilient elements or damping elements, such as spring-damper arrangements, these kinematic degrees of freedom can be damped and limited. The spring characteristic and/or the damping characteristic can be changed for example via controllable valves or rheological fluids.

The method for operating the simulator according to the invention will be described hereinafter in further detail. In order to simulate travel of a vehicle in a straight line for example, the simulator performs the following steps in accordance with one embodiment of the method according to the invention:

The driven wheels are driven, such that an acceleration force in a straight line acts on the person. At the same time, the control cabin is inclined towards the rear with respect to the machine frame, such that the driver perceives a slight pitch movement towards the rear. In order to then simulate different start-up behavior in combination with pitch movements, different pitch movements can be simulated in succession with the same starting acceleration. It is thus possible to determine which of the pitch movements are perceived by a driver as realistic and comfortable.

In order to improve the start-up forces and in particular in order to overcome the static friction and therefore improve a highly dynamic simulation, the method for simulating straight-line acceleration may comprise the following steps, for example:

the wheel assemblies and the machine frame are rotated about the main axis of rotation. In this rotation mode, the wheel axes point substantially towards the center and in particular the extensions of the wheel axes intersect the main axis. At the same time, the control cabin is rotated in the opposite direction at the same rotational speed, whereby this remains unmoved with respect to the underlying surface in the stationary system. Although the wheels have a certain rolling speed, the person remains unmoved. In order to start up the simulator, the steered wheels can now be steered in such a way that the driving simulator is set in motion with rotating machine frame. However, this movement does not have to be in a straight line, but for example may also assimilate the negotiation of a bend or travel along a cycloid. In order to nevertheless simulate a linear acceleration, the control cabin can be rotated with respect to the machine frame via the rotary support in such a way that the acceleration acting on the driver always acts linearly in one direction although the simulator itself is moving over a curved path.

In all embodiments it may be that three wheel assemblies, four wheel assemblies, five wheel assemblies, or more wheel assemblies comprise a wheel drive or each comprise a wheel drive for driving a wheel about the respective wheel axis of the wheel of the respective wheel assembly.

In all embodiments it may be that the wheel assemblies, in particular four, five, or more wheel assemblies protrude outwardly from the machine frame 1. The wheel assemblies 2 are preferably distributed approximately uniformly over the circumference of the machine frame 1. The wheel assemblies 2 and in particular the kinematics arrangements 12 protrude substantially radially outwardly with respect to the main axis of rotation 8. The main axes of rotation of the chassis of the kinematics arrangements, about which the wheels or the elements of the chassis are moved or pivoted in the event of compression and extension, may extend approximately tangentially to a circle extending about the main axis of rotation 8 and lying in a plane parallel to the underlying surface.

In the case of four wheel assemblies, the wheel assemblies where appropriate protrude outwardly from the machine frame rotated 90° to one another. The main axes of rotation of the chassis of the kinematics arrangements, about which the wheels are moved in the event of compression and extension also extend in this case preferably rotated approximately 90° to the adjacent chassis.

In all embodiments it may be that the wheels or the wheel are or is driven by three, four or five wheel assemblies.

In all embodiments the guide device 23 may be formed in such a way that desired movements of the control cabin 6 are made possible with respect to the machine frame 1, such as an inclination or a lifting movement, and that movements in translation in a parallel plane to the underlying surface 3 are blocked.

In all embodiments the kinematics arrangement 12 can be formed as a chassis in the technical sense. A chassis in the technical sense is for example a stringing together of substantially rigid individual elements, such as wishbones, levers or arms, of which the kinematic degrees of freedom are limited at least in part by a spring-damper arrangement. The substantially rigid elements are interconnected in particular via rotary bearings, pivot bearings or other bearings.

In all embodiments the movement device 16 may be used where appropriate as a movement device according to FIG. 6.

In all embodiments it may be that the device according to the invention and the machine frame 1 of the device according to the invention, in particular of the driving simulator, can be moved in different and/or any directions. In particular, the simulator thus does not have any pronounced preferred direction of movement. The kinematics arrangements 12 of the wheel assemblies 2 are preferably suitable and/or designed for enabling the simulator to move in different, arbitrary directions.

The chassis may also damp excitations caused by unevennesses in the ground, such that these cannot be perceived by the person sitting in the simulator or are only perceived slightly. The use of a chassis kinematics additionally makes it possible to determine the pitch and roll pole of the simulator from a design viewpoint so as to thus enable a pitch and roll compensation. The wheel position variables, such as toe, camber, etc. can also be dynamically adjusted, where appropriate. The integration of a caster of the tire is also possible.

On account of the non-stationary orientation of the wheels relative to the driving direction, the chassis kinematics is designed where appropriate such that a pitch and roll compensation is possible and is dependent on the wheel position and the driving direction. In all embodiments it may be that a connection of two or more kinematics arrangements of the simulator is provided. This connection acting as stabilizer can be formed hydraulically, electrically or mechanically.

LIST OF REFERENCE SIGNS 1. machine frame
2. wheel assembly
3. underlying surface
4. wheel
5. steering axis
6. control cabin
7. seat
8. main axis of rotation
9. steering drive
10. wheel drive
11. wheel axis
12. kinematics arrangement
13. resilient and/or damping elements
14. spring-damper arrangement
15. wheel suspension
16. movement device
17. gimbaled mount
18. first support element
19. second support element
20. first axis of rotation
21. second axis of rotation
22. parallel kinematics arrangement
23. guide device
24. rotary support
25. wheel contact faces
26. wheel support
27. control arm
28. cockpit
29. opening of the control cabin
30. energy store
31. rotary support drive
32. rotary support bearing
33. bearing of the kinematics arrangement
34. linear drive
35. control cabin support
36. main arm
37. universal joint
38. first universal joint axis
39. second universal joint axis
40. outer shell

The invention claimed is:

1. A self-propelled driving simulator, comprising:
at least three wheel assemblies, each wheel assembly rotatable about its own wheel assembly steering axis, said wheel assemblies each containing at least one wheel with a wheel contact face being moved on an underlying surface, wherein the wheel assemblies together are rotatable about a main axis of rotation which is substantially a normal vector of a plane spanned by the wheel contact faces;
a machine frame being movable by means of said wheel assemblies on the underlying surface, said machine frame being coaxial with and rotatable about said main axis of rotation;
a control cabin containing a seat for a person and operator control elements for controlling the driving simulator, said control cabin being coaxial with said machine frame and rotatable about said main axis of rotation relative to said machine frame;
a movement device means for rotatably and inclinably coupling said control cabin to said machine frame, said movement device means having a pitch axis of rotation generally perpendicular to said main axis of rotation and a roll axis of rotation generally perpendicular to said main axis of rotation and said pitch axis of rotation, wherein, via said movement device means an inclination of said control cabin with respect to said machine frame about at least one of the pitch axis or the roll axis is made possible, and whereby via said movement means said control cabin has a degree of freedom of rotation with respect to said machine frame, with a result that said control cabin can be rotated by said movement device means with respect to said machine frame about said main axis of rotation; and a kinematics arrangement, wherein at least one of said wheel assemblies or said wheels are connected to said machine frame via said kinematics arrangement functioning as a chassis, said kinematics arrangement containing resilient and/or damping suspension elements to at least one of damp or cushion unevennesses in the underlying surface, wherein the simulator is configurable into a configuration where said wheel assemblies and said machine frame together are rotatable about the main axis of rotation in a first rotational direction at a rotational speed and said control cabin is simultaneously rotatable about the main axis of rotation in a second rotational direction opposite the first rotational direction at the same rotational speed so that the seat in the control cabin remains stationary with respect to the underlying surface.

2. The driving simulator according to claim 1, wherein at least one of said wheel assemblies contains a wheel drive for driving said wheel about a wheel axis.

3. The driving simulator according to claim 1, wherein at least one of said wheels of each of said wheel assemblies is rotatable about the steering axis over 360° in an unlimited manner and/or in both directions of rotation.

4. The driving simulator according to claim 1, wherein said control cabin is rotatable by said movement device means with respect to said machine frame about the main axis of rotation over 360°.

5. The driving simulator according to claim 1, further comprising a steering drive, said wheels of at least one of said wheel assemblies are disposed rotatably about the steering axis so as to be actively steerable via said steering drive.

6. The driving simulator according to claim 1, wherein each of said wheels assemblies has two of said wheels.

7. The driving simulator according to claim 1, further comprising a steering drive, wherein:
said steering drive is formed by a rotary drive for turning about the steering axis; or
said steering drive being driven, formed or supported by a rotational speed difference between said two wheels of a respective one of said wheel assemblies being spaced apart from one another and driven about a respective wheel axis; or
said steering drive is formed by a rotary drive for turning about the steering axis and by a rotational speed difference between said two wheels of a respective one of said wheel assemblies distanced from one another and driven about a respective wheel axis.

8. The driving simulator according to claim 1, wherein said kinematics arrangement is configured to move said machine frame with respect to at least one of the underlying surface, said wheels or said wheel assemblies, wherein the relative movement is made possible in or along a direction of the main axis of rotation.

9. The driving simulator according to claim 1, wherein via said movement device means said control cabin is connected to said machine frame, wherein an active rotation of said control cabin with respect to said machine frame about the main axis of rotation is made possible by said movement device means.

10. The driving simulator according to claim 1, wherein said movement device means is configured to moves said control cabin with respect to said machine frame, wherein a movement of said control cabin with respect to said machine frame is in translation in or along the main axis of rotation, a parallel displacement of said control cabin with respect to said machine frame, and/or a lifting movement of said control cabin by said movement device means with respect to said machine frame.

11. The driving simulator according to claim 1, wherein said movement device means is a gimbaled mount, via said gimbaled mount said control cabin can be inclined with respect to said machine frame, said gimbaled mount having first and second support elements, said first support element is connected to said machine frame so as to be able to be inclined about a first axis of rotation, said second support element is connected to said first support element so as to be able to be inclined about a second axis of rotation, and wherein the first axis of rotation and the second axis of rotation extend substantially orthogonally to one another.

12. The driving simulator according to claim 1, wherein said movement device means has a parallel kinematics arrangement, via said parallel kinematics arrangement said control cabin can be inclined with respect to said machine frame, wherein said parallel kinematics arrangement is a three-legged support selected from the group consisting of a hydraulic three-legged support, a pneumatic three-legged support, an electrically driven three-legged support, a hexapod, a hydraulic hexapod, a pneumatic hexapod, and an electrically driven hexapod.

13. The driving simulator according to claim 12, wherein said movement device means includes a guide device coupled to said control cabin and to said machine frame or part of said movement device, said guide device is formed in such a way that a rotation of said control cabin with respect to said machine frame about the main axis of rotation, an inclination of said control cabin with respect to said machine frame about the pitch axis and/or the roll axis, and a lifting movement in translation of said control cabin with respect to said machine frame are permitted by said guide device, wherein all other degrees of freedom of said control cabin with respect to said machine frame are substantially blocked by said guide device.

14. The driving simulator according to claim 13, wherein said movement device means further containing:
a rotary support bearing;
a rotary support drive; and
a rotary support disposed rotatably with respect to said machine frame via said rotary support bearing and said rotary support drive, and in that said parallel kinematics arrangement, said gimbaled mount and/or said guide device act on or are provided on said rotary support.

15. The driving simulator according to claim 1,
wherein the driving simulator is a self-sufficiently movable driving simulator that can be controlled by the person in said control cabin;
further comprising at least one wheel drive for moving the driving simulator and having drives;
further comprising a steering drive for steering the driving simulator; and
further comprising an energy store for providing energy for said drives of said wheel drive.

16. The driving simulator according to claim 14, further comprising an outer shell rigidly connected to one of said control cabin, said rotary support or said machine frame, said outer shell is a hollow body which at least partially surrounds at least one of said control cabin or said seat for receiving the person.

17. The driving simulator according to claim 16, wherein said outer shell has an image display area extending over at least a majority of a field of vision of the person and follows an inner face of said outer shell.

18. The driving simulator according to claim 1, wherein said resilient and/or damping elements include a spring-damper arrangement and a wheel suspension.

19. The driving simulator according to claim 1, wherein one of a plurality of said wheel assemblies or all of said wheel assemblies each contain at least one wheel drive for driving a wheel about the respective wheel axis.

20. A method for simulating a transition from an unaccelerated state into an accelerated state performed on the self-propelled driving simulator according to claim 1, which comprises the steps of:

driving and rolling the wheels of the wheel assemblies on the underlying surface, wherein wheel axes of rotation of all the wheels intersect the main axis of rotation, such that the machine frame rotates about the main axis of rotation in a first direction of rotation at a first angular speed;

simultaneously rotating the control cabin about the main axis of rotation in a second direction of rotation at a second angular speed, wherein the second direction of rotation is opposite the first direction of rotation, and the second angular speed is equal to the first angular speed, such that the control cabin remains substantially stationary and unaccelerated with respect to the underlying surface; and rotating the driven and rolling wheels about the steering axis, such that at least one wheel axis of rotation is disposed at a distance from the main axis of rotation of the control cabin, such that the control cabin is moved at least in translation and experiences an acceleration.

* * * * *